United States Patent
Vanimisetti et al.

(10) Patent No.: US 9,328,266 B2
(45) Date of Patent: May 3, 2016

(54) METHOD FOR MITIGATING CURE SHRINKAGE IN HIGH TEMPERATURE-PROCESSED THERMOSETTING ADHESIVES AND SMC

(71) Applicant: GM Global Technology Operations LLC, Detroit, MI (US)

(72) Inventors: Sampath K. Vanimisetti, Bangalore (IN); Chen-Shih Wang, Warren, MI (US); Vidyashankar R. Buravalla, Bangalore (IN)

(73) Assignee: GM Global Technology Operations, LLC, Detroit, MI (US)

( * ) Notice: Subject to any disclaimer, the term of this patent is extended or adjusted under 35 U.S.C. 154(b) by 306 days.

(21) Appl. No.: 13/657,245

(22) Filed: Oct. 22, 2012

(65) Prior Publication Data
US 2014/0011016 A1 Jan. 9, 2014

(30) Foreign Application Priority Data

Jul. 9, 2012 (IN) .............................. 757/KOL/2012

(51) Int. Cl.
| | |
|---|---|
| C08J 9/32 | (2006.01) |
| C09J 11/04 | (2006.01) |
| C08K 7/24 | (2006.01) |
| B29K 105/16 | (2006.01) |
| B29C 65/48 | (2006.01) |
| B29C 65/00 | (2006.01) |
| B29C 61/00 | (2006.01) |

(52) U.S. Cl.
CPC .................. *C09J 11/04* (2013.01); *B29C 61/00* (2013.01); *B29C 65/487* (2013.01); *B29C 65/489* (2013.01); *B29C 65/4835* (2013.01); *B29C 65/4855* (2013.01); *B29C 66/006* (2013.01); *B29C 66/721* (2013.01); *B29C 66/7311* (2013.01); *B29C 66/7315* (2013.01); *B29C 66/73941* (2013.01); *B29K 2105/165* (2013.01); *B29K 2995/0096* (2013.01); *C08K 7/24* (2013.01); *Y10T 428/249984* (2015.04)

(58) Field of Classification Search
CPC .............. C08K 3/08; C08K 7/16; C08K 7/18; C08K 7/20; C08K 7/22
See application file for complete search history.

(56) References Cited

U.S. PATENT DOCUMENTS

| | | | |
|---|---|---|---|
| 3,264,073 A | | 8/1966 | Schmitt |
| 4,035,547 A | | 7/1977 | Heller, Jr. et al. |
| 5,589,523 A | * | 12/1996 | Sawaoka et al. ............... 523/211 |
| 6,099,679 A | | 8/2000 | Kärem et al. |
| 6,742,258 B2 | | 6/2004 | Tarbutton et al. |
| 7,175,204 B2 | | 2/2007 | Tarbutton et al. |
| 7,510,621 B2 | | 3/2009 | Sigler et al. |
| 7,517,425 B2 | | 4/2009 | Schroeder et al. |
| 7,811,405 B2 | | 10/2010 | Basu et al. |
| 8,101,036 B2 | | 1/2012 | Schroeder et al. |
| 2004/0086706 A1 | * | 5/2004 | Schneider ...................... 428/323 |
| 2006/0062977 A1 | | 3/2006 | Sigler et al. |
| 2008/0085568 A1 | | 4/2008 | Wang et al. |
| 2010/0178433 A1 | | 7/2010 | Wang et al. |
| 2012/0234488 A1 | | 9/2012 | Ulicny et al. |
| 2012/0247761 A1 | * | 10/2012 | O'Malley ...................... 166/278 |
| 2013/0266813 A1 | | 10/2013 | Faulkner |

FOREIGN PATENT DOCUMENTS

JP 2007-200649 8/2007

OTHER PUBLICATIONS

Fernholz, Kedzie, et al., "Development of a Tool to Measure Bond-Line Read-Through Defects," 7th Annual Automotive Composites Conference and Exposition/Society of Plastics Engineers, Troy, Michigan (Sep. 11-13, 2007).

Hodgson, Darel E., et al., ASM Handbook, vol. 2: Properties and Selection: Nonferrous Alloys and Special-Purpose Materials, "Shape Memory Alloys," pp. 897-902 (1990).

Poncet, Philippe P., "Nitinol Medical Device Design Considerations," SMST-2000: Proceedings of the International Conference on Shape Memory and Superelastic Technologies, Apr. 30, to May 4, 2000, Scott M. Russell and Alan R. Pelton, eds., pp. 441-455 (2001).

* cited by examiner

*Primary Examiner* — Hannah Pak
(74) *Attorney, Agent, or Firm* — Harness, Dickey & Pierce, P.L.C.

(57) ABSTRACT

A thermosetting polymer composite composition (such as thermosetting SMC composition) or a thermosetting adhesive composition containing reduced-volume hollow shape-memory alloy particles in the thermosetting polymer composite composition or adhesive composition experiences little or no volume loss during a curing at a temperature above the transformation temperature for the particles.

11 Claims, No Drawings

METHOD FOR MITIGATING CURE SHRINKAGE IN HIGH TEMPERATURE-PROCESSED THERMOSETTING ADHESIVES AND SMC

FIELD

The present disclosure relates to thermoset composites and to adhesive bonding of composite panels, particularly in automotive assembly and paint operations.

BACKGROUND

This section provides background information related to the present disclosure that is not necessarily prior art.

It is challenging to prepare high quality class-A surfaces using thermoset composite parts such as sheet molding compound (SMC) panels. SMC panels are typically joined to a support structure using thermoset adhesives prior to attaching them to vehicle bodies. For example, exterior SMC door panels may be bonded to an internal reinforcing member using a thermoset adhesive. Typically, the thermoset adhesives are cured with thermal cure cycle to produce a strong joint. However, the thermal cure cycle intended to cure the adhesive introduces minute surface distortions in the vicinity of the bond-line known as bond-line read-out (BLRO), which deteriorates the visual appeal of the class-A surface. Significant BLRO often results in part rejection and the subsequent time and cost of rework.

In the automotive field, a thermoset adhesive may be cured using a two-stage process. In the first stage, uncured adhesive is applied between the substrates to be joined. External pressure is then applied upon a bonding fixture to maintain dimensional tolerances as it is heated at the cure temperature for 3-5 minutes. Heat may be supplied to the adhesive until the adhesive is cured to "green strength," which allows one to handle panels joined by adhesive before the adhesive is completely cured. "Green strength" allows joined panels to continue through assembly while the adhesive continues to cure. While the panels and adhesive are heated, the panels experience an overall rise in temperature that results in thermal expansion. This, in combination with any differences in the coefficients of linear thermal expansion (CLTEs) between the panels, also leads to distortion of the bond-line. At the same time, the adhesive itself marginally distorts due to chemical cure shrinkage. As the adhesive cures partially to green strength, a fraction of these distortions are retained in the joint. The panels joined to green strength are then painted in a paint booth followed by additional heating to cure the paint. The paint "bake" cycle requires another 20-30 minutes of heating of the joined panels, resulting in further surface distortion.

Curing thermosetting adhesives with heat produces surface distortion or BLRO due to thermal expansion induced dimensional changes in the SMC material and cure shrinkage in the adhesive cure. Thicker SMC panels can be employed to increase stiffness and keep distortions below a threshold at which they are perceptible to the unaided eye. Using panels that are thicker than necessary for such structural requirements, however, adds weight and undermines the reason—weight reduction—for using SMC panels in the first place in automotive applications.

The visual quality of automotive exterior, class-A surfaces for SMC panels may also be affected by cure shrinkage in the SMC itself during curing of molded SMC composition. Inter-fiber micro-shrinkage in SMC causes fiber read-out (FRO) defects in the surface of the SMC, which can be described as fibers revealed on the surface of the SMC. Such surface defects of the SMC are magnified during the surface finishing steps, telegraphing the defect onto the surface of the paint finish. Low-profile additives now added to SMC to prevent or minimize FRO themselves create voids that adversely affect the physical properties of the SMC. In addition, during subsequent coating bakes in which applied coating layers are thermally cured, the voids outgas to cause paint-pop defects in the cured coating layer.

These problems of BLRO, FRO, and paint-pop defects in the finish have been significant impediments to using SMCs in automotive class-A surfaces.

SUMMARY

This section provides a general summary rather than a comprehensive disclosure of the invention and all of its features.

A thermosetting polymer composite composition (such as thermosetting SMC composition) or a thermosetting adhesive composition that experiences little or no volume loss during a thermal process includes reduced-volume hollow shape-memory alloy particles in the thermosetting polymer composite composition or adhesive composition. The "reduced-volume" hollow shape-memory alloy particles have volumes that are less than that of their trained volumes; and the reduced-volume hollow shape-memory alloy particles irreversibly expand during a thermal process (particularly thermal cure) carried out at or above the transformation temperature of the particles. The increased volume of the particles may compensate at least in part and preferably wholly for a volume loss in other components of the composite or adhesive composition that occurs during the thermal process.

In various embodiments, the thermosetting polymer composite composition or thermosetting adhesive composition contains micrometer-sized reduced-volume hollow shape-memory alloy particles trained at a training temperature $T_{set}$ to have the form of hollow particles with a volume $V_{set}$. Such particles may be, for example, hollow microspheres, hollow micro-ellipsoids, micro-tubes, hollow micro-filaments, or other regularly- or irregularly-shaped micro-sized hollow particles that have a trained volume $V_{set}$ that is greater than the volumes of the particles in their reduced-volume state. "Micro-sized" as used here means such particles having a longest length of from about 5 micrometers to about 100 micrometers. The particles are compressed, crushed, collapsed, or otherwise reduced in volume at a temperature below the training temperature $T_{set}$ for the shape-memory material to have a volume $V_{red}$ that is less than their trained volume $V_{set}$, then the reduced-volume hollow shape-memory particles incorporated in the thermosetting polymer composite composition or thermosetting adhesive composition. When the thermosetting polymer composite composition or the adhesive composition is thermally heated to a temperature equal to or greater than transformation temperature $T_{tr}$, for example to cure the composition, the reduced-volume hollow shape-memory particles expand again up to their trained volume $V_{set}$. The reduced-volume hollow shape-memory particles may be included in the thermosetting polymer composite composition or the adhesive composition in an amount sufficient to compensate (to a desired degree) for a volume loss in the other composite or adhesive components of the composition during the thermal process (e.g., during the thermal curing process).

In certain embodiments, the transformation temperature $T_{tr}$ of the shape-memory particle is set marginally higher—perhaps from about 1-10° C. higher—than the minimum temperature at which the thermal process (e.g., thermal cure process) is carried out, and the thermosetting polymer composite composition or thermosetting adhesive composition is at the transformation temperature $T_{tr}$ for only a portion of the thermal process. In this way, the volume increase from the shape-memory particles and the time at which the volume increase takes place can be controlled.

Further disclosed are methods of using the adhesive composition containing volume-reduced shape-memory particles to bond two articles through application of the adhesive composition between a surface of each article adjoined to the other, and thermally curing of the adhesive composition, as well as bonded articles made by the method. During thermal cure of the adhesive composition shrinkage is avoided or reduced by volume expansion of the included reduced-volume hollow shape-memory particles which have a transformation temperature $T_{tr}$ that is reached or exceeded during the thermal cure.

In one embodiment, uncured adhesive including reduced-volume hollow shape-memory particles is applied along the bond-line between two substrates. The "bond-line" is the line along which two substrates, at least one of which is a polymeric composite, are joined together. The substrates are then heated in an oven to cure the adhesive at least in part at a temperature at which the shape-memory alloy expands. In particular, the amount of expansion of the hollow shape-memory particles in the adhesive counters the amount of chemical cure shrinkage of the adhesive in curing such that BLRO is at least reduced and may be minimized or eliminated. The sum amount of expansion of the reduced-volume hollow shape-memory particles in the adhesive may be about equal to the loss of volume of other components during the cure process.

The disclosed adhesive composition eliminates or minimizes BLRO below threshold levels when it is used to bond panels. BLRO is an optical defect attributed to minute surface distortions in the vicinity of a bond-line between the panels. The BLRO defect forms when a relative thermal expansion is locked in between the panels during the thermal cure of an adhesive composition. Other factors, such as thermal expansion and shrinkage of the adhesive during the thermal cure process, also contribute to the severity of the defect. The disclosed adhesive composition avoids or mitigates the cure induced shrinkage by replacing adhesive volume that is lost during thermal cure of the adhesive with adhesive volume that is added by expansion of the reduced-volume hollow shape-memory particles during the thermal cure of the adhesive.

Also disclosed are methods for using the SMC including the reduced-volume hollow shape-memory particles to make thermoset molded parts and the parts made by the methods. The disclosed polymeric composite composition, e.g. SMC or BMC, that were thermally processed to expand the reduced-volume hollow shape-memory particles may be free of low-profile additives and provide painted surfaces having reduced or no fiber read-out and reduced or free of incidence of paint-pop defects due to outgassing during paint coating bakes. During the method of making thermoset molded parts from the uncured composite composition, e.g. SMC, the volume of the reduced-volume hollow shape-memory particles increases on reaching or exceeding their transformation temperature $T_{tr}$ to compensate for shrinkage of the SMC material (or other composite composition) during curing. The volume increase of the reduced-volume hollow shape-memory particles prevents or mitigates FRO. Further, the increased volume contained inside the expanded hollow particles of the shape-memory alloy does not outgas during subsequent thermal processes the molded SMC may undergo, such as paint thermal cure cycles. The disclosed SMC may be, and preferably is, free of low profile additives, which form voids that adversely affect the physical properties of SMC thermoset molded articles and that additionally outgas to cause popping in thermoset coating layers on the thermoset molded articles.

In a further embodiment, an SMC exterior part prepared by the methods, such as a panel, is incorporated into an automotive vehicle body. The SMC part includes hollow shape-memory particles, where the particles have their trained volumes.

In discussing the disclosed adhesive, SMC, and methods of making and using them, "a," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value or amount allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. The terms "comprises," "comprising," "including," and "having," are inclusive and therefore specify the presence of stated items, but do not preclude the presence of other items. As used in this specification, the term "or" includes any and all combinations of one or more of the associated listed items. When the terms first, second, third, etc. are used to differentiate various items from each other, these designations are merely for convenience and do not limit the items.

Further areas of applicability will become apparent from the description provided herein. The description and specific examples in this summary are intended for purposes of illustration only and are not intended to limit the scope of the present disclosure.

DETAILED DESCRIPTION

A detailed description of exemplary, nonlimiting embodiments follows.

A thermosetting polymer composite composition or a thermosetting adhesive composition includes reduced-volume hollow shape-memory alloy particles. The thermosetting polymer composite composition or a thermosetting adhesive composition has reduced volume loss during a thermal process that is carried out at or above the transformation temperature of the hollow shape-memory alloy particles due to irreversible expansion of the particles at such a temperature. The thermosetting composite composition includes a thermosetting polymer matrix material, a filler, which may be a particulate filler or a fiber filler or both, and the reduced-volume hollow shape-memory alloy particles. The thermosetting adhesive composition includes a thermosetting polymer and crosslinker or curing agent system and the reduced-volume hollow shape-memory alloy particles.

Nonlimiting examples of thermosetting polymers suitable for the thermosetting polymer composite composition include unsaturated polyesters, phenolic resins, vinyl ester resins, polyurethanes, amino resins, and epoxy resins. The thermosetting polymer matrix material further includes a curing agent or crosslinker reactive with the thermosetting polymer (unless the thermosetting polymer is self-crosslinking) and, if desirable, a catalyst for the crosslinking reaction or, in the case of ethylenically unsaturated thermosetting polymers or resins such as unsaturated polyesters and polyacrylate-functional resins, an initiator for the double-bond addition reaction.

For SMC and BMC thermosetting compositions the thermosetting polymer typically is or includes an unsaturated polyester resin. In general, unsaturated polyester resins are the polycondensation reaction products of one or more dihydric alcohols and one or more ethylenically unsaturated dicarboxylic acids. Specific examples of ethylenically unsaturated dicarboxylic acids include maleic acid, citraconic acid, itaconic acid, fumaric acid, mesaconic acid, tetracosanoic acid, their anhydrides, halides, and polymerizable esters, particularly the methyl and ethyl esters, and combinations of these. Mixtures of unsaturated dicarboxylic acids and saturated or aromatic dicarboxylic acids may also be used, for examples mixtures in which the amount of unsaturated polycarboxylic acid may typically exceeds fifty percent by weight of the mixture. Nonlimiting examples of saturated or aromatic polycarboxylic acids that may be copolymerized with the ethylenically unsaturated dicarboxylic acids include ortho-phthalic acid, isophthalic acid, terephthalic acid, succinic acid, adipic acid, sebacic acid, methyl-succinic acid, cyclohexane dicarboxylic acid, their anhydrides, halides, and polymerizable esters (especially the methyl and ethyl esters), and combinations of these. Specific, nonlimiting examples of dihydric alcohols that may be polymerized in forming the unsaturated polyester include ethylene glycol, propylene glycol, diethylene glycol, dipropylene glycol, 1,3-butanediol, 1,4-butanediol, neopentyl glycol, hexylene glycol, 1,6-hexanediol, hydrogenated bisphenol A, 2,2'-di(4-hydroxypropoxyphenyl) propane, 2,2-di(4-hydroxyethoxyphenyl)propane,1,3-propanediol, cyclohexanedimethanol, polyethylene glycol, polypropylene glycol and combinations of these. The number average molecular weight of the polymerizable unsaturated polyester may vary over a considerable range, but for example the unsaturated polyesters may have a number average molecular weight of from about 300 to about 5,000, or, more narrowly, from about 500 to about 4,000.

The unsaturated polyester resin polymer may be chain extended. As examples, the unsaturated polyester may be chain extended with glycidyl esters of bisphenol A, glycidyl esters of linear and cycloaliphatics, phenol-formaldehyde novolacs, aliphatic fatty acids, aliphatic fatty esters, polyethers, and polyamines. Hydroxyl-group capped unsaturated polyesters may be chain extended with an isocyanate compound. The isocyanate compound may be, for example, a diisocyanate such as toluene diisocyanate, methylene di-para-phenylene isocyanate, or isophorone diisocyanate.

The thermosetting polymer composite composition containing the unsaturated polyester may also include an unsaturated monomer such as an ethylenically unsaturated mono- or polyacrylate monomer or mono- or polyvinyl monomer that copolymerizes with the unsaturated polyester. Nonlimiting examples of such monomers include alkyl (meth)acrylates such as methyl (meth)acrylate, butyl (meth)acrylate, and 2-ethylhexyl (meth)acrylate; polymerizable vinyl compounds such as styrene, divinyl benzene, and substituted styrenes such as alpha-methyl styrene and t-butyl styrene; multifunctional (meth)acrylates such as ethylene glycol di(meth)acrylate or trimethylol propanetri(meth)acrylate; vinyl acetate; and diallylphthalate. "(Meth)acrylate" is used to denote that the acrylate or the methacrylate or both may be used. Styrene is one preferred ethylenically unsaturated monomer. The ethylenically unsaturated monomer may typically be used at up to about 70 wt %, or in the range of about 15 to about 60 wt %, or in the range of about 20 to about 50 wt %, based on thermosetting components. In general the vinyl monomer may be considered to be a reactive diluent for the unsaturated polyester composition.

The thermosetting polymer composite composition may also include an organic initiator, nonlimiting examples of which are tertiary-butylperoxy 2-ethylhexanoate; 2,5-dimethyl-2,5-di(-benzoylperoxy)cyclohexane; tertiary-amylperoxy 2-ethylhexanoate; tertiary-butyl isopropyl carbonate; tertiary-hexylperoxy 2-ethylhexanoate; 1,1,3,3-tetramethylbutylperoxy 2-ethylhexanoate; tertiary-hexylperoxypivalate; tertiary-butylperoxy pivalate; 2,5-dimethyl-2,5-di(2-ethylhexanoylperoxy) cyclohexane; dilauroyl peroxide; dibenzoyl peroxide; diisobutyryl peroxide; dialkyl peroxydicarbonates such as diisopropyl peroxydicarbonate, di-n-propyl peroxydicarbonate, di-sec-butyl peroxydicarbonate, dicyclohhexyl peroxydicarbonate; di-4-tertiarybutylcyclohexyl peroxydicarbonate and di-2 ethylhexyl peroxydicarbonate and azo initiators such as 2,2'-azobis(2,4-dimethyl-valeronitrile). In general, the initiator may typically be about 0.01 to about 6 wt % of the composite composition.

The thermosetting polymer composite compositions also includes a filler, which may be a particulate filler or a fiber filler or both. Nonlimiting examples of suitable fiber fillers include glass fibers, carbon and graphite fibers, polymeric fibers including polyester, polyamide, and aramid fibers, boron filaments, boron nitride whiskers, Kevlar, ceramic fibers, metal fibers, asbestos fibers, beryllium fibers, silica fibers, silicon carbide fibers, natural organic fibers such as cotton and sisal, and combinations of these. Compositions for preparing sheet molding compounds (SMCs) and bulk molding compounds (BMCs) are typically glass-fiber reinforced thermosetting unsaturated polyester compositions. There is as a difference between SMC and BMC in the fiber length and content; BMC compositions generally have a lower glass fiber content and shorter glass fiber length. A typical SMC composition may contain glass fibers with lengths of about 25-50 mm, while a typical BMC may contain glass fibers with lengths of about 6-12 mm. Glass fibers are available in a variety of forms including, for example, mats of chopped or continuous strands of glass, glass fabrics, chopped glass and chopped glass strands and blends thereof. Preferred fibrous reinforcing materials include 12-, 25-, and 50-mm fiberglass fibers.

The thermosetting polymer composite composition may include a particulate filler instead of or in addition to a fiber filler. Nonlimiting examples of particulate fillers that may be included in the thermosetting polymer composite composition include calcium carbonate, calcium hydroxide, silicic anhydride powder, kaolin, alumina, talc, glass microspheres, silica, mica, titania, wollastonite, clay, diatomaceous earth, ceramic spheres, and expanded perlite, and vermiculate. The fillers may be used in any combination.

The thermosetting composite composition further includes the reduced-volume hollow shape-memory alloy particles.

Shape-memory alloys are alloys that exhibit a reversible, diffusionless transition between phases that is dependent on temperature and stress. SMAs exist in different temperature-dependent phases. The SMA assumes distinct configurations in the its martensite and austenite phases. When the SMA is in the martensite phase and is heated, it begins to change into the austenite phase. The temperature at which this phenomenon starts is often referred to as austenite start temperature ($A_s$).

The temperature at which this phenomenon is complete is called the austenite finish temperature ($A_f$).

A shape-memory alloy deformed in its cold state will recover its permanent shape when heated above the temperature ($T_{tr}$, also called the transformation finish temperature $A_f$) at which its phase transition is complete. Shape memory materials can exhibit pseudoelastic (superelastic) behavior, allowing the material to recover a significant amount of strain due to the reversible, metallurgical phase transformations by changes in the state of stress. The superelastic behavior is characterized by a linear elastic and a nonlinear pseudoelastic stress-strain response allowing the material to recover a significant amount of strain due to the reversible austenitic-martensitic phase transformation. Conventional nitinol materials can typically recover principle strains on the order of up to 8 percent (see "Nitinol Medical Device Design Considerations" by Philippe P. Poncet, SMST-2000: Proceedings of the International Conference on Shape Memory and Superelastic Technologies, pp. 441-455). The phase stability of nitinol is a function of both temperature and stress. The phase stability in the unstressed state is characterized by the transformation temperatures $M_f$, $M_s$, $A_s$, and $A_f$ (equivalent to $T_{tr}$, as used in describing the disclosed technology). Martensite is the stable phase at temperatures below $M_f$, the martensitic finish temperature. Upon heating, the martensitic structure begins a reversible thermoelastic phase transformation to austenite when the temperature reaches $A_s$, the austenitic start temperature. The transformation to austenite is completed when the temperature reaches $A_f$, the austenitic finish temperature. Upon cooling the austenite, the material begins to transform to martensite at a temperature equal to $M_s$, the martensitic start temperature, and completes its transformation to martensite at a temperature equal to $M_f$ the martensitic finish temperature. The shape memory effect of nitinol is demonstrated by shaping the material in the relatively high-temperature austenitic phase and setting the shape by an appropriate heat treatment. Upon cooling the material below the martensitic transformation temperature, the material can be deformed to a second shape configuration while in the martensitic state. Upon heating to temperatures above the austenitic transformation temperature the material will return to its original shape configuration. Conventional nitinol materials can typically recover up to 8 percent strain by this shape memory effect (reference ASM Handbook, Volume 2, Shape Memory Alloys, Darel Hodgson et al., page 899).

Nonlimiting examples of suitable shape-memory alloys are alloys of zinc, copper, gold, iron, aluminum or nickel, optionally with other metals. Specific, nonlimiting examples include copper-zinc-aluminum-nickel alloys, copper-aluminum-nickel alloys, copper-zinc-aluminum alloys nickel-titanium alloys, Ni—Ti—X (X being V, Co, Cu, Fe) alloys, iron-nickel alloys, iron-manganese-silicon alloys, and copper-zinc alloys.

Shape-memory alloys may be made by casting, using vacuum arc melting or induction melting to minimize impurities in the alloy and ensure good mixing of the alloyed metals. The cast ingot may then be formed into its final shape. Processes for manufacturing hollow metal microspheres are known and include, for example, plasma deposition of the metal on hollow glass microspheres; one method is described in U.S. Pat. No. 3,264,073, incorporated herein by reference. The hollow shape-memory alloy particles are "trained" to a hollow shape at a training temperature; the training temperature is at least the temperature at which the thermosetting polymer composite composition or the thermosetting adhesive composition will be cured. Such hollow shapes may be, for example, hollow microspheres, hollow micro-ellipsoids, hollow micro-tubes, hollow micro-filaments, or other regularly- or irregularly-shaped micro-sized hollow particles. The trained particles are cooled below the training temperature and then compressed, crushed, collapsed, or otherwise reduced in volume, for example by roller processing or impact processing. Ti—Ni shape memory alloys, for example, may be trained by heating the material to 400-500° C. for from several minutes to several hours, then quenched with water to bring them below the transition-training temperature. In general, the longer the preservation time, the higher the transition temperature will be.

The thermosetting polymer composite composition may optionally contain additives typically used in such compositions, for example release agents like stearic acid, lauric acid, calcium stearate, zinc stearate, magnesium stearate, sodium laurate, calcium laurate, zinc laurate, magnesium laurate and sodium laurate, and organic phosphate esters; impact modifiers, nonlimiting examples of which include relatively flexible polymers such as elastomers such as nitriles, butadienes, EPs, EPDMs, halogenated elastomers (e.g., chloro- and fluoro-elastomers), silicone elastomers, polyurethane elastomers, latex, thermoplastic elastomers, olefinic elastomers and natural rubbers; a pigment or dye; stabilizers, such as fatty acids, dimer acids, trimer acids, polyester polyols and combinations thereof; viscosity modifiers, nonlimiting examples of which are any Group II metal oxide or Group II metal hydroxide, such as typically calcium oxide, calcium hydroxide, magnesium hydroxide, magnesium oxide, zinc oxide, tin oxide, and combinations of these; and so on, The additives are added in amounts that are typically for thermosetting polymer composite formulations. Further optional ingredients include cobalt promoters, nucleating agents, lubricants, plasticizers, chain extenders, colorants, antistatic agents, fire retardants, and the like. The thermosetting polymer composite composition preferably is free of low profile agents.

The thermosetting polymer composite composition may be prepared by pre-blending together the thermosetting polymer matrix material (thermosetting polymer or resin such as unsaturated polyester, any reactive monomer, crosslinker, and curing agent and any catalyst). Blending may be accomplished, for example, by high speed agitation for about 30 minutes. As one method for making SMC compositions, any particulate filler, the reduced-volume hollow shape-memory alloy particles, and any additives or other components are then added to the blend and mixed to form a paste. The SMC paste is combined on an SMC machine with a chopped fiber-glass roving (e.g., 2.54 cm to 1.27 cm in length). For BMC compositions and other thermosetting polymer composite compositions generally all of the remaining components are blended into the thermosetting polymer matrix material using suitable heavy mixing equipment such as a Haake Mixer, a Drais Mixer, an extruder or the like. It is also possible in some instances to introduce one or more of the composition ingredients to the molding die as separate components, i.e., without pre-blending.

Any suitable molding technique may be employed for compressing and shaping articles from the thermosetting polymer composite composition, including, for example, compression molding, resin transfer molding, injection compression, thermoforming, and injection molding. Generally, molding of the compound includes placing the compound into a mold followed by applying elevated temperatures, elevated pressures or both within the mold such that the sheet molding compound assumes the shape of the mold. Compression molding comprises introducing the pre-blend and/or unblended components onto a lower die, the moving one or both dies towards the other to form a closed cavity. The dies may possess embossing structures and texture designed to transfer embossments and grain to the molded article, such as a door, as is known in the art. During pressing, the components are pressed together between the upper and lower dies and shaped by application of heat and pressure. Sheet molding compound compositions (SMCs) are often pressed within a temperature range of about 135° C. to about 177° C., more preferably about 138° C. to about 160° C. The dies exert a pressure on the composition of, for example, about 1000 to about 2000 psi. The pressing operation may last, for example, about 30 seconds to 2 minutes. The thermosetting polymeric material cures into a set shape and the shape memory particles expand irreversibly, the amount of their expansion depending on such factors as their trained volume, their reduced volume, the temperature, and the length of time the composition is kept at or above the transformation temperature. The molded part is removed from the mold.

Automotive parts are molded from SMC usually by hot pressing and from BMC by hot pressing or injection molding. Automotive parts prepared with sheet molding compounds include, for example, tailgates, hoods, roofs, etc. Automotive parts prepared with bulk molding compounds include, for example, reflectors for automobile headlights.

The thermosetting adhesive composition includes a thermosetting polymer and crosslinker or curing agent system and the reduced-volume hollow shape-memory alloy particles. The reduced-volume hollow shape-memory alloy particles may be of the materials and made by the methods already described. In various examples, the thermosetting adhesive composition may include from about 0.1 to about 5 weight percent of the reduced-volume hollow shape-memory particles or, more narrowly, from about 1 to about 2 weight percent of the reduced-volume hollow shape-memory particles.

Nonlimiting examples of useful thermosetting polymers and crosslinkers or curing agents for the thermosetting adhesive composition include phenolics, melamines, resorcinol formaldehydes, furans, polyesters, polyimides, urea formaldehyde, acrylics, elastomers, amines, epoxies (including those cured with amine crosslinkers), polyurethanes, natural and synthetic rubbers, silicone compounds, fluoropolymers and phenolics. The thermosetting adhesive composition may also include any of the usual additives for such compositions, nonlimiting examples of which are diluents, plasticizers, extenders, pigments and dyes, fire-retarding agents, thixotropic agents, expanding agents, flow control agents, adhesion promoters and antioxidants.

A process of bonding two substrates using the thermosetting adhesive composition will now be described. A volume of uncured thermoset adhesive containing the volume-reduced shape-memory alloy is applied between two substrates. A bond line is formed by the overlap of the two substrates.

Either or both of the substrates may be composites such as the cured thermoset composite containing the reduced-volume shape memory particles already described. Sheet molding compound, such as described above, is one preferred substrate. Additional substrates, such as glass fiber-reinforced thermoplastics, and combinations of substrates that are suitable for this method would be known to a person of ordinary skill in the art. The substrates that are adhesively joined may be of the same material or they may be different materials. Besides a composite, the substrates may be a metal such as steel.

The applied adhesive is heated to thermally cure the adhesive. The thermal cure is carried out at a temperature T at or above, which may be only slightly above, the transformation temperature $T_{tr}$ of the shape-memory alloy particles. Because $T \geq T_{tr}$, the shape-memory alloy particles irreversibly expand during the thermal cure of the adhesive. As in the case with the thermosetting polymer composite composition, as the adhesive cures the shape memory particles expand irreversibly, the amount of their expansion depending on such factors as their trained volume, their reduced volume, the temperature, and the length of time the composition is kept at the temperature.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A thermosetting polymer composite comprising a thermosetting polymer matrix material, a filler selected from the group consisting of particulate fillers, fiber, and combinations thereof, and from about 0.1 to about 5 weight percent of reduced-volume hollow shape-memory alloy particles having a maximum length of from about 1 micrometer to about 100 micrometers, wherein the reduced-volume hollow shape-memory alloy particles undergo irreversible volume expansion during a thermal process to compensate for a volume loss of the cured thermosetting polymer matrix material and the reduced-volume hollow shape-memory alloy particles have a trained shape selected from the group consisting of hollow microspheres, hollow micro-ellipsoids, hollow micro-tubes, and combinations thereof.

2. The thermosetting polymer composite according to claim 1, wherein the thermosetting polymer composite is a sheet molding compound composition.

3. A method of making a cured, thermoset polymer composite, comprising:
   providing the thermosetting polymer composite according to claim 1; and
   curing the thermosetting polymer composite at least in part at a temperature above a transformation temperature of the reduced-volume hollow shape-memory alloy particles so that the reduced-volume hollow shape-memory alloy particles undergo irreversible volume expansion to compensate for volume loss resulting from shrinkage of the thermosetting polymer matrix material after the curing.

4. The method according to claim 3, wherein the thermosetting polymer composite has minimal or no volume change after the curing of the thermosetting polymer matrix material.

5. The method according to claim 3, wherein the thermosetting polymer composite is cured in a compression mold.

6. A thermosetting adhesive composition comprising a thermosetting polymer and crosslinker or curing agent system and from about 0.1 to about 5 weight percent of reduced-volume hollow shape-memory alloy particles having a maximum length of from about 1 micrometer to about 100 micrometers, wherein the reduced-volume hollow shape-memory alloy particles undergo irreversible volume expansion during a thermal process to compensate for a volume loss of the cured thermosetting polymer and the reduced-volume hollow shape-memory alloy particles have a trained shape selected from the group consisting of hollow microspheres, hollow micro-ellipsoids, hollow micro-tubes, and combinations thereof.

7. A method of bonding two articles together by applying the thermosetting adhesive composition according to claim 6 between adjoining surfaces of the two articles and curing the thermosetting adhesive composition to bond the two surfaces together, wherein the cure temperature is at least in part at a temperature around the transformation temperature of the reduced-volume hollow shape-memory alloy particles.

8. The method according to claim 7, wherein the thermosetting adhesive composition has minimal or no volume change after the curing of the thermosetting adhesive.

9. The method according to claim 7, wherein at least one of the two articles comprises an SMC article, wherein the reduced-volume hollow shape-memory alloy particles expand such that bond line read-out is not visible.

10. A bonded SMC assembly prepared according to the method of claim 9.

11. An automotive vehicle comprising the bonded SMC assembly according to claim 10.

* * * * *